3,182,989
WORK HOLDER
Otto F. Colbert, Whittier, Calif.
(10107 Adella Ave., South Gate, Calif.)
Filed Jan. 7, 1963, Ser. No. 249,724
3 Claims. (Cl. 269—81)

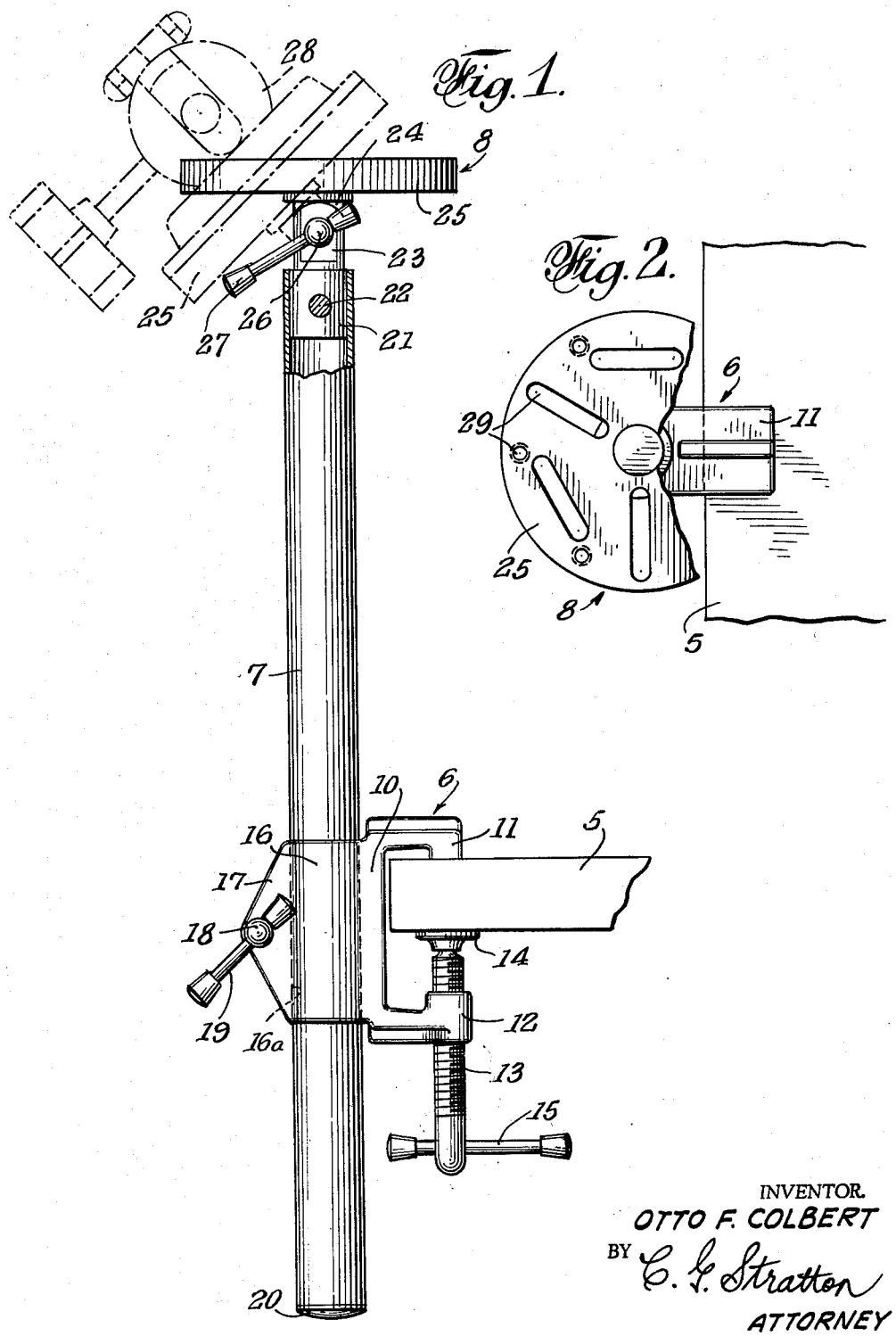

This invention relates to a work holder especially for mounting on a work bench or similar support.

Frequently it becomes necessary to perform operations on various items or pieces of equipment from a position at a work bench other than the normal sitting position. For various reasons it may be more advantageous, for instance, to forego the use of the usual seat and either stand at the bench or mount a stool more elevated than the usual seat. In such case, tools, gauges, clamps, mounting boards, special vises, fixtures and other such items may not find usable space on the work bench or, if the space is available, have too inconvenient an operative position relative to the piece of equipment occupying the bench.

Accordingly, an object of the present invention is to provide a work holder for mounting a piece of work or apparatus at an elevated position relative to the work surface of a bench or comparable support.

Another object of the invention is to provide a work holder of the character mentioned that has simple universal adjustability.

A further object of the invention is to provide a work holder that is adapted for mounting various operating, measuring, gauging and testing devices at various heights above the work surface of a bench or like support and at a desired angular disposition for maximum convenience in use.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view, partly in section, of a work holder according to the present invention.

FIG. 2 is a broken top plan view thereof.

The top 5 of a work bench exemplifies a support on which the present holder is adapted to be mounted.

The present work holder comprises, generally, a bench-top clamp 6, a standard 7 mounted in said clamp for longitudinal and rotational adjustable movement relative to the clamp, and a tiltable head 8 carried by the upper end of the standard 7.

The clamp 6 is shown as comprising a body 10 with opposed clamp jaws 11 and 12 of which the jaw 12 is internally threaded for an adjusting screw 13 that has a clamp pad 14 at one end, for engaging one face of the top 5 and a key 15 at the opposite end for rotating said screw. The jaw engages the opposite face of the top 5.

Said clamp 6 is provided with a longitudinal tubular body 16 having a bore 16a, the body being split and provided with forward ears 17. A clamp screw 18 with a key 19 is provided for drawing the ears together to constrict the size of the bore 16a.

The standard 7 is shown as a tubular member that loosely fits the bore 16a and is gripped in said bore by the mentioned constriction thereof by means of screw 18 and its key 19. Said standard may have a desired length, eighteen inches being exemplary, so that the same may be longitudinally adjusted to extend partly below and partly above the clamp body 16, as adjustment requires. The lower end of said standard is preferably provided with a cap or plug 20. The upper end is open.

The head 8 is shown as a stud 21 that is fitted into the upper end of the standard 7 and is preferably secured as by a bolt 22, said stud being provided with a bifurcated upwardly extending end 23; a tongue 24 fitted into said bifurcated end 23 and provided with a support plate 25; and a clamp screw 26 with a rotation key 27 provided for releasably clamping said tongue 24 in the bifurcation of end 23 to hold the plate 25 in fixed position relative to the standard, at the angle of adjustment to said standard, as desired. The dot-dash lines show one such angular adjustment and also a vise 28 secured to plate 25, as an example of an item that may be mounted on said plate for a particular intended purpose.

As shown in FIG. 2, the plate 25, in various ways, may be provided with tapped holes, key slots and the like 29, for the purpose of removably fastening items to said plate 25.

It will be clear that, after the clamp 6 has been applied to a top 5, the height and rotational orientation of the mounting plate 25 may be adjusted and locked in adjustment by the clamp screw 18, and that the plate 25, whether normal to the standard or at a desired angle thereto, may be adjusted and locked by the screw 26. Substantially universal adjustability is afforded by the two adjusting means provided.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A work support comprising
    (a) a clamp for connection to a bench top and provided with a tubular body and means for constricting the bore of said tubular body,
    (b) a tubular standard longitudinally and rotationally adjustable in said bore and locked in position by the bore-constricting means of the clamp body,
    (c) a fixed stud in one end of the standard,
    (d) a work-mounting plate,
    (e) a hinged connection between said stud and plate, and
    (f) means to lock said connection to hold the plate in fixed adjusted position on the standard.

2. A work support according to claim 1 in which the bore of the clamp is normal to the axis of the hinged connection.

3. A work support according to claim 1 in which the work-mounting plate is adapted for the attachment of tools thereto.

References Cited by the Examiner
UNITED STATES PATENTS

| 840,241 | 1/07 | Nootbar | 248—276 X |
| 979,070 | 12/10 | Hoffman | 248—279 X |
| 2,586,636 | 2/52 | Fischer et al. | 269—97 X |

FOREIGN PATENTS 571,802   2/24   France.

ROBERT C. RIORDON, Primary Examiner.